United States Patent Office 2,993,878
Patented July 25, 1961

2,993,878
POLYMERIZATION OF METHACROLEIN
Barnard Mitchel Marks, Wilmington, Del., assignor to E. I. du Pont de Nemours and Company, Wilmington, Del., a corporation of Delaware
No Drawing. Filed Oct. 1, 1956, Ser. No. 612,926
7 Claims. (Cl. 260—67)

The present invention relates to the polymerization of methacrolein and more particularly to the polymerization of methacrolein to form novel, soluble high molecular weight polymethacroleins.

Methacrolein and many other 2-substituted acroleins possess an inherent tendency to undergo autopolymerization with themselves and give infusible, insoluble cross-linked resins which are of little or no value as plastic materials. The spontaneous polymerization of methacrolein occurs on slight heating, contact with oxygen, or even contact with light and is greatly accelerated when acidic, basic or free radical catalysts are added. These insoluble products are probably composed of low molecular weight, vinyl polymer units whose aldehyde groups have undergone further reaction, common to aldehydes to give a three dimensional, cross-linked, insoluble polymer. There is further the possibility that other types of cross-linking reactions participate in the formation of the polymer structure. Soluble copolymers containing minor amounts of methacrolein have been polymerized by the usual free radical catalysts, but attempts to incorporate larger concentrations of methacrolein have invariably led to the formation of insoluble polymer. In addition, methacrolein and other $\alpha,\beta$-unsaturated aldehydes have been converted to homopolymers by polymerization in alcoholic solution. However, the products obtained by this process are low molecular weight, due to the chain transfer activity of the primary alcohol and, in addition, are unstable towards acids, due to the presence of unstable vinyl ether linkage in the polymer resulting from the 1,4 addition of the monomeric unsaturated aldehyde. Thus the polymerization of methacrolein to high molecular weight, soluble, viscosity stable polymers has heretofore not been possible.

It is, therefore, one of the objects of the present invention to prepare solid, high molecular weight polymers of methacrolein which are soluble in organic solvents. It is another object to provide a novel process for the polymerization of $\alpha,\beta$-unsaturated aldehydes. Further objects will become apparent hereinafter.

The objects of the present invention are accomplished by polymerizing methacrolein in a polar medium with a free radical catalyst, the quantity of said catalyst being less than 0.02 mol percent of the monomer and a finely divided, adsorbtive surface at a temperature below 50° C. and recovering a dispersion of high molecular weight soluble polymethacrolein having an inherent viscosity of 0.3 to 3.0. The ability to obtain viscosity stable high molecular weight polymethacrolein depends in part on suppressing the 1,4-addition polymerization which yields unstable vinyl ether linkages in the polymer chain, and increasing the desirable 3,4-addition polymerization and in part in preventing the chain transfer tendencies as well as the cross-linking reactions of the pendent aldehyde group. It is believed that the adsorbtive surface employed in the process of the present invention favors the 3,4-addition polymerization and suppresses the 1,4-addition polymerization. By polymerizing the methacrolein to a finely divided, dispersed polymer, which is not soluble in the polar polymerization medium, the process of the present invention prevents the cross-linking reaction of the polymethacrolein with addition monomer which occurs when the polymer is polymerized in bulk, or is polymerized in a solvent in which both the monomer and polymer remain dissolved. In bulk polymerizations, the polymer adsorbs monomer, or remains in solution and can therefore react readily with additional monomer. In solution polymerizations, crosslinking can readily occur because both polymer and monomer exist in the same phase. By separating the polymer from the monomer phase it was discovered, that the undesirable crosslinking reactions could be substantially avoided.

The polymerization of methacrolein to give stable, high molecular weight soluble polymers, according to the process of the present invention, is carried out in a polar environment in which the monomer is soluble but the polymer is not. As disclosed hereinabove, it is necessary in order to obtain the high molecular weight linear polymethacrolein, that the polymer be obtained in the form of a dispersion since both a polymer solution and a prematurely coagulated polymer will result in the formation of cross-linked intractable polymers with free radical catalysts. The polymerization is therefore generally carried out in an aqueous medium. However, the solubility of methacrolein in water is relatively low and leads to the formation of low molecular weight polymer if reasonable fast polymerization rates are desired. The solubility of the monomer can be increased without affecting the solubility of the polymer by employing water-alcohol mixtures. The ratio of the mixed solvent to the monomer is not critical as long as the polymer precipitates out of the water-alcohol mixture to form the dispersion. As in other free radical polymerizations, the molecular weight of the polymer is dependent on the monomer concentration with respect to the quantity of catalyst employed, and the monomer concentration must be sufficient to allow the polymerization to proceed to high molecular weight polymer. In general, the monomer concentration will vary from 7 to 40% by weight of the medium. The polymerization at concentrations exceeding 40% may give rise to unstable dispersions. Such polymer dispersions, however, may be stabilized to a limited extent by the addition of surface active agents to the polymerization recipe. At monomer concentrations below 7% the polymerization rates are slow and the molecular weights obtainable within a reasonable polymerization time too low to be practical.

The monomer employed in the present invention should be extremely pure to obtain the best results. Thus it is preferred to purify methacrolein which is commercially available, since such methacrolein contains impurities in addition to polymerization inhibitors. Purification of methacrolein can be carried out in several ways either by reacting the impurities to form insoluble compounds or by physical means such as adsorption and distillation. The preferred method of purifying methacrolein is by distillation of the crude monomer in the presence of a high boiling primary or secondary alcohol. Pure, colorless methacrolein is obtained by this method.

The catalyst employed in the present invention is a free radical catalyst capable of forming free radicals at the polymerization temperatures employed. In general, all types of free radical catalyst may be employed, including peroxides and azonitriles. It is however, preferred to employ redox catalysts, since such catalyst systems are generally more soluble in the aqueous phase and since furthermore in such catalyst systems the rate of free radical formation is less dependent on temperatures. Redox catalysts suitable in the process of the present invention include such systems as hydrogen peroxide with thiourea, benzoyl peroxide with dimethyl p-toluidine, or soluble ferric phosphate, cupric oxide, cuprous oxide, nickel oxide, cobalt oxide, niobium oxide, and vanadium pentoxide in combination with one or more of the following: sodium bisulfite, sodium thiosulfate, sodium sulfoxalate, sodium hypophosphite and sodium phosphite. Particularly preferred catalyst and those which give rise to the most stable polymethacroleins are catalyst systems employing copper oxide, cobalt oxide and nickel oxide.

It has been found that in employing a redox catalyst the rate of polymerization can be improved if the polymerization is carried out in a slightly acidic medium. The polymerization of methacrolein to form the novel polymers of the present invention is further dependent on the presence of an adsorbtive surface in a finely divided state. It is believed that the surface adsorbs both the catalyst and the monomer and thereby causes the polymerization to proceed by a 3,4-addition thus giving rise to essentially linear polymers. The preferred surface is a finely divided silica surface formed in situ in the reaction zone. However, it is quite feasible to employ other adsorbtive surfaces such as alumina, titania or zirconia, since the effect of the adsorbtive surface on the polymerization of methacrolein is thought to be a physical rather than a chemical effect. The adsorbtive surface can also be formed by one of the catalyst ingredients. Thus ferric phosphate is employed, no silica need be added since the ferric phosphate will form insoluble iron hydroxide and thus give rise to the surface necessary.

The concentration of the catalyst should be extremely low in order to achieve the high molecular weight desired. In general, the concentration is less than 0.05 mol percent on the basis of the monomer added. Higher concentrations of catalyst cause the polymerization to proceed too rapidly and result in over-heating of the polymerization mixture and the formation of low molecular weight polymers. Coagulation may occur under such conditions giving rise to intractable polymers. The quantity of the adsorbtive surface employed is not critical and may be varied over a wide range. In general, the quantity will vary from 0.005 to 0.025% by weight of the solvent employed.

The polymerization of methacrolein to the novel polymers of the present invention is carried out in an inert atmosphere since as is well known, oxygen will catalyze the polymerization of methacrolein to cross-linked insoluble resins. The polymerization temperature employed should be below 50° C. and preferably in the range of 0 to 35° C. At temperatures below 0° C. the rate of polymerization is slow. Temperatures above 50° C. should be avoided, since with increasing temperature the rate of the chain transfer reaction will increase more rapidly than the rate of polymerization and thus cause the formation of low molecular weight polymer. The process of the present invention is preferably carried out in a batch operation.

The process of the present invention is further illustrated by the following examples:

*Example I*

Into a clean three necked 500 ml. flask equipped with stirrer, nitrogen inlet and thermometer was charged under nitrogen 275 ml. of distilled deoxygenated water, to which 0.25 ml. of tetraethyl orthosilicate was added dropwise. To the reaction mixture was then added under agitation 75 ml. of deoxygenated methanol, 5 mg. of copper oxide and 0.8 ml. of a 1% solution of sodium bisulfite, and 50 ml. of methacrolein. On complete addition agitation was stopped and polymerization was allowed to proceed undisturbed. The solution became opalescent after 20 minutes. Polymerization was continued for 20 hours. The resulting polymer dispersion was coagulated by the addition of sodium sulfate. The reaction mixture was filtered, the solid polymeric precipitate was washed with water and methanol and dried in a vacuum. There was obtained 7.5 g. of a solid, white polymer. The polymer was soluble in dimethyl formamide and was found to have an inherent viscosity of 1.5. The inherent viscosity of the polymer remained essentially unchanged after standing for over 30 days.

*Example II*

Employing the procedure outlined in Example I, 50 ml. of methacrolein was polymerized in 275 ml. of water and 75 ml. of methanol employing 0.25 ml. of hydrolyzed tetraethyl-orthosilicate with a catalyst comprising 15 mg. sodium bisulfite and 37 mg. potassium persulfate. The reaction temperature was maintained at 25° C. The yield of the polymer on washing and drying was 40% of the starting material. The inherent viscosity of the polymer was 0.43.

*Example III*

Employing the procedure outlined in Example I, 150 ml. of methacrolein was polymerized in 750 ml. of water and 270 ml. of methanol employing 2 mg. of soluble ferric phosphate and 7 mg. of sodium bisulfite as the catalyst. The reaction temperature was maintained at 25° C. The yield of the polymer on washing and drying was 55% of the starting material. The inherent viscosity of the polymer was 0.42.

*Example IV*

Employing the procedure outlined in Example I, 50 ml. of methacrolein was polymerized in 400 ml. of water and 75 ml. of methanol in the presence of 0.25 ml. of hydrolyzed tetraethyl orthosilicate with 7 mg. of sodium bisulfite and 15 mg. of potassium persulfate. The polymerization was carried out at room temperature. The yield of the solid white polymer on washing and drying was 6.0 g. The inherent viscosity of the polymer was 1.0.

*Example V*

Employing the procedure outlined in Example I, 100 ml. of methacrolein was polymerized in 550 ml. of water, 100 ml. of methanol in the presence of 0.25 ml. of hydrolyzed tetraethyl orthosilicate with 8 mg. of sodium bisulfite and 5 mg. of cobalt oxide. The reaction was carried out at 30° C. and 20 mg. of ammonium perfluorocaprylate was added as a dispersing agent to stabilize the polymer dispersion. On washing and drying there was obtained 12.7 g. of a solid, white polymer. The polymethacrolein was found to have an inherent viscosity of 0.78.

Although the examples illustrated hereinabove have shown the polymerization of methacrolein primarily, the process of the present invention is also applicable to other α-substituted acroleins as well as acrolein itself. However, the molecular weights of these polymers are not as high as those obtained with methacrolein and thus methacrolein is the preferred monomer.

The polymers prepared by the process of the present invention are high molecular weight, soluble, stable methacrolein polymers having a melting point at 243° C. The polymers of the present invention differ from the prior art polymers of methacrolein in their molecular weight and stability. The molecular weight of aldehyde polymers is best determined by employing a relative measure such as inherent viscosity. The inherent viscosity measurements listed in the above examples were obtained by employing an 0.5% solution of the polymer in dimethylformamide and measuring the inherent viscosity at 35° C. Inherent viscosity is calculated by the following formula:

$$\eta_{inh} = ln\left(\frac{t}{t_o}\right) \times \frac{1}{c}$$

wherein $t_o$ is the viscosity of the solvent, and $t$ the viscosity of the solution and $c$ the concentration of the polymer in gram per 100 cc. of solvent.

Polymethacrolein prepared by the process of the present invention is a colorless transparent plastic that can be cast from solution into stiff films and sheets. The polymers are stable and do not discolor or degrade on prolonged exposure to the atmosphere. The stability of the polymer is such that it can be compression molded at 250 to 305° C. into clear films. The ability to mold polymethacrolein clearly indicates the superior stability of the polymethacroleins of the present invention as compared to prior art polymers. The polymer reacts with the usual aldehyde reactants to form diacylates, oximes acetals, thioacetals, Shiff bases, and can also be reduced to the corresponding methallyl alcohol polymer. The reactions with the typical aldehyde reagents indicate reaction with greater than 70% of the theoretical number of aldehyde groups.

Polymethacrolein prepared by the process of the present invention may be employed for a large number of applications which include coating applications and casting of films, sheets and other articles. The stability of polymethacrolein may be improved by the addition of stabilizers; pigments or other additives are readily included. The polymer may be blended with other polymeric materials. The polymers are particularly valuable as chemical intermediates and a wide variety of polymers can be prepared through reaction of the aldehyde group. The polymers can, of course, be cross-linked and are readily combined with fibrous structures to form reinforced plastics with outstanding physical properties.

I claim:

1. A normally solid, addition homopolymer of methacrolein having an inherent viscosity in dimethylformamide of 0.3 to 3.0, when measured as a 0.5% solution at 35° C.

2. A process for polymerizing methacrolein which comprises contacting methacrolein in the substantial absence of oxygen at a temperature below 50° C. with a water-alcohol medium containing less than 0.02% by weight of the monomer of a polymerization catalyst capable of forming free radicals under polymerization conditions, and from 0.005 to 0.025% by weight of the medium of finely divided silica and recovering a dispersion of high molecular weight, dimethyl formamide-soluble polymethacrolein.

3. The process as set forth in claim 2 wherein the catalyst is a redox catalyst.

4. The process as set forth in claim 3 wherein the redox catalyst is a copper oxide, sodium bisulfite catalyst.

5. The process as set forth in claim 2 wherein the polymerization is carried out at 25° C.

6. The process as set forth in claim 2 wherein the polymerization is carried out in the presence of a surface-active agent.

7. The process as set forth in claim 2 wherein the water-alcohol medium is a water-methanol medium.

References Cited in the file of this patent

UNITED STATES PATENTS

| | | |
|---|---|---|
| 2,212,894 | Allen | Aug. 27, 1940 |
| 2,485,239 | Izard | Oct. 18, 1949 |
| 2,569,932 | Izard | Oct. 2, 1951 |
| 2,657,192 | Miller et al. | Oct. 27, 1953 |